United States Patent
Piironen et al.

(10) Patent No.: US 10,516,244 B1
(45) Date of Patent: Dec. 24, 2019

(54) ADAPTER AND ADAPTATION METHOD FOR HAND-HELD ELECTRONIC DATA PROCESSING DEVICE

(71) Applicant: Bittium Wireless Oy, Oulu (FI)

(72) Inventors: Timo Piironen, Oulu (FI); Veli Matti Lastumäki, Ruukki (FI)

(73) Assignee: Bittium Wireless Oy, Oulu (FI)

( * ) Notice: Subject to any disclaimer, the term of this patent is extended or adjusted under 35 U.S.C. 154(b) by 0 days.

(21) Appl. No.: 15/994,730

(22) Filed: May 31, 2018

(51) Int. Cl.
| | |
|---|---|
| *H01R 31/06* | (2006.01) |
| *H01R 24/62* | (2011.01) |
| *H01R 13/62* | (2006.01) |
| *H01R 13/621* | (2006.01) |
| *H01R 13/15* | (2006.01) |
| *H01R 107/00* | (2006.01) |

(52) U.S. Cl.
CPC ............ *H01R 31/06* (2013.01); *H01R 13/15* (2013.01); *H01R 13/621* (2013.01); *H01R 13/6205* (2013.01); *H01R 24/62* (2013.01); *H01R 2107/00* (2013.01)

(58) Field of Classification Search
CPC ........ H01R 24/54; H01R 25/00; H01R 31/06; H01R 33/88; H01R 33/94
USPC ................................. 439/638, 929
See application file for complete search history.

(56) References Cited

U.S. PATENT DOCUMENTS

| | | | |
|---|---|---|---|
| 9,148,474 B2* | 9/2015 | Skvoretz | ................ H01R 13/74 |
| 10,038,288 B2* | 7/2018 | Choi | .................. H01R 13/5219 |
| 2015/0081944 A1 | 3/2015 | An | |
| 2018/0115128 A1 | 4/2018 | Choi et al. | |

FOREIGN PATENT DOCUMENTS

| | | |
|---|---|---|
| EP | 2999060 A1 | 3/2016 |
| WO | 2016/032818 A1 | 3/2016 |

OTHER PUBLICATIONS

European Search Report dated Dec. 7, 2019 issued by the European Patent Office in relation to corresponding EP Application No. EP 18175746, 1 pg.

* cited by examiner

*Primary Examiner* — Phuong K Dinh
(74) *Attorney, Agent, or Firm* — FisherBroyles, LLP

(57) ABSTRACT

An adapter for a hand-held electronic data processing device includes an electrical male connector insertable and configured to fit into a female connector of the electronic data processing device, wherein electrical connector elements, on a surface of the adapter, are coupleable with elements of an external connector, and the surface of the electrical connector elements are at least approximately averagely parallel to the surface of the adapter adjacent to them. The electrical male connector and the connector elements are in electrical connection with each other on or within the adapter for electrical adaptation between the external connector and the female connector of the electronic data processing device.

14 Claims, 3 Drawing Sheets

ADAPTER AND ADAPTATION METHOD FOR HAND-HELD ELECTRONIC DATA PROCESSING DEVICE

BACKGROUND

Field

The invention relates to an adapter and adaptation method for a hand-held electronic data processing device.

Description of the Related Art

Hand-held electronic data processing devices such as a mobile phones, tablets and portable computers often have at least one female connector such as a female universal serial bus (USB) connector. Such a female connector gathers easily dirt and moisture inside it which oxidizes the pins and also otherwise weakens an electrical contact with its counterpart. Because the male connector projects outwards, it is like a lever and an accidental wrenching force may break the device, either or both the connectors and/or the connection. Hence, there is a need to improve the connection means.

SUMMARY

The invention is defined by the independent claims. Embodiments are defined in the dependent claims.

BRIEF DESCRIPTION OF THE DRAWINGS

Example embodiments of the present invention are described below, by way of example only, with reference to the accompanying drawings, in which.

DETAILED DESCRIPTION

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. All combinations of the embodiments are considered possible if their combination does not lead to a structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

Figure 1A:
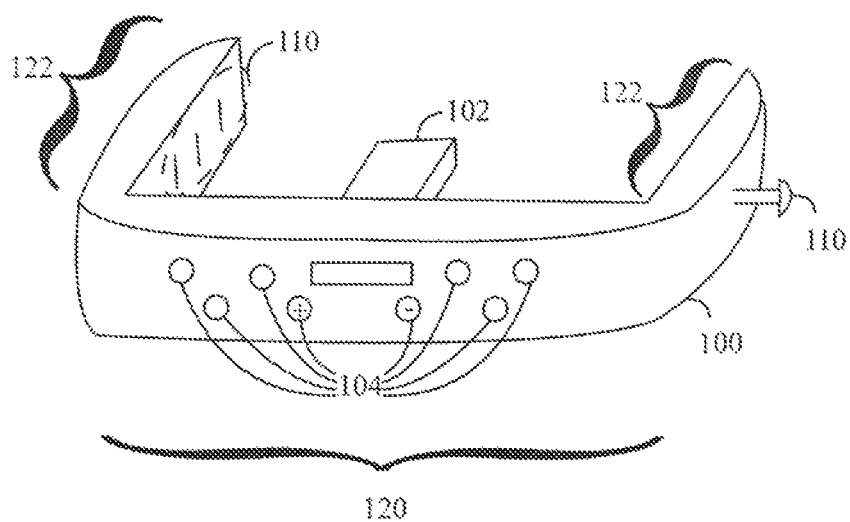
FIG. 1A illustrates an example an adapter.
Figure 2:
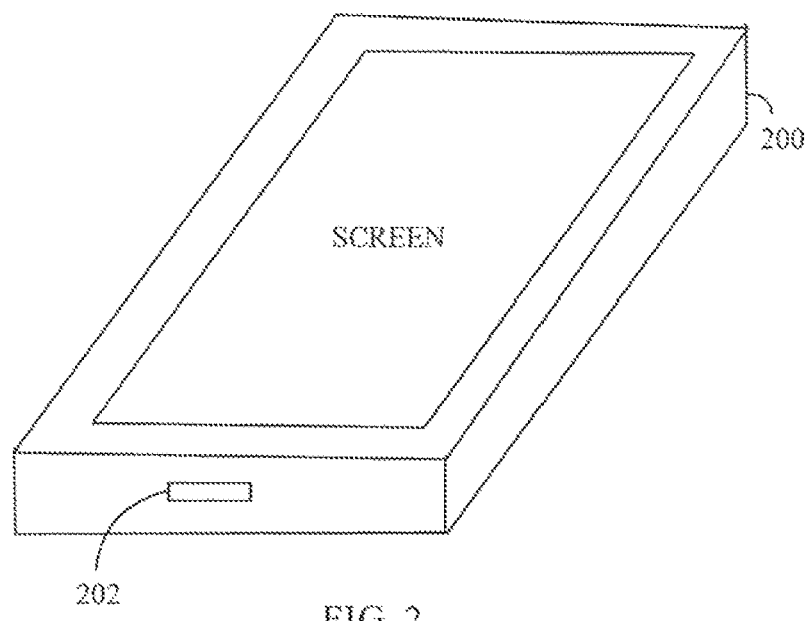
FIG. 2 illustrates an example of an electronic device.

FIG. 1A illustrates an adapter for a hand-held electronic data processing device. FIG. 2 illustrates an electronic data processing device 200, which may be terminal equipment, a mobile phone, a tablet, a portable computer or the like.

The adapter 100 comprises at least one electrical male connector 102 (Figures show only one for clarity reasons). Each of the at least one electrical male connector 102 projects outwards from a surface of the adapter 102 around it. Each of the electrical male connector 102 is insertable into a corresponding female connector 202 of the electronic data processing device 200 (see FIGS. 2 and 3). Next, a reference to only one male connector 102 is made but it applies to each of the at least one electrical male connector 102 and the at least one corresponding female connector 202.

The electrical male connector 102 may also be removed from the female connector 202, and the insertion and removal may be performed repeatedly using non-zero force. The required force may be from tenths of Newtons to tens of Newtons, for example. The electrical male connector 102 fits into the female connector 202 of the electronic data processing device 200. The female connector 202 and the male connector 102 are counterparts of each other.

Figure 4:
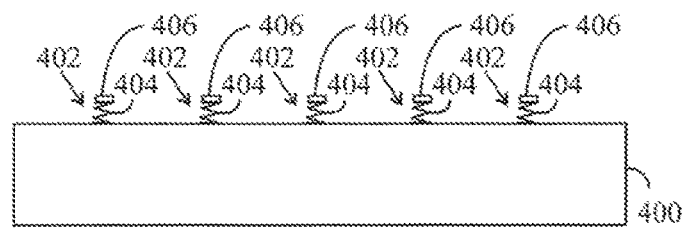
FIG. 4 illustrates an example of spring loaded pins.

Electrical connector elements 104 are on a surface of the adapter 100, and they can be coupled with elements 402 of an external connector 400 (although FIG. 4 illustrates an external connector 400 with spring loaded pins 402, the external connector 400 is not limited to that). The electrical connector elements 104 and the elements 402 of the external connector 400 are counterparts to each other. The electrical connector elements 104 and the elements 402 of the external connector 400 may be similar to those of professional/authority devices, and thus they fulfil stricter requirements than connectors of consumer use. The electrical connector elements 104 on the surface of the adapter 100 do not gather dirt. The electrical connector elements 104 do not oxidize because moisture easily dries or is accidentally and/or on purpose wiped off from the relatively flat surface which is not in a (deep) recess. The electrical connector elements 104 can also be used to quick connection. The electrical connector elements 104 are suitable for professional/authority use such as for police, military, heath care, fire brigade, for example etc. The radio system of the professional/authority may be TETRA (Terrestrial Trunked Radio) system or DMR (Digital Mobile Radio), for example.

Figure 1B:
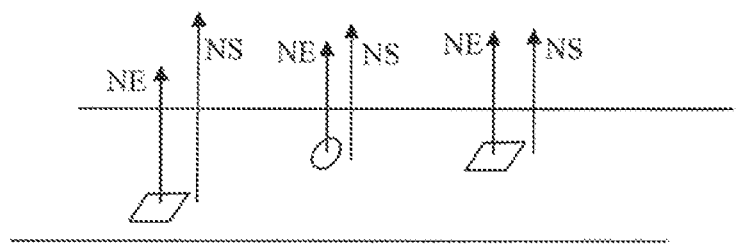
FIG. 1B illustrates an example where the surface of the electrical connector elements is at least approximately parallel to the surface of the adapter adjacent to them.

As FIG. 1B illustrates, the surface of the electrical connector elements 104 of the adapter 100 may be at least approximately parallel to the surface of the adapter 100 adjacent to them. A normal NE of an element 104 may be at least approximately averagely parallel to a normal NS of the surface of the adapter 100 adjacent to them. The electrical connector elements 104 and the elements 402 of the external connector 400 are counterparts to each other. The surface of the electrical connector elements 104 is coupled to its counterpart. The electrical connector elements 104 and the elements 402 of the external connector 400 are immobile when they are in physical and electrical contact with each other, and the electrical connector elements 104 and the elements 402 of the external connector 400 they do not slide against each other during the connection is made (within manufacturing tolerances). The electrical connector elements 104 and the elements 402 of the external connector 400 may form a butt connection because their end surfaces are moved towards each other in the direction parallel to their normal in order to have a physical and also galvanic contact therebetween.

Electric energy is and/or electric signals are passed through the surface(s). No electric energy and/electric signals can pass between the electric connector elements 104 and their counterparts elsewhere except through the surfaces of the electrical connector elements 104 and the elements 402 coupled to each other. The electrical device 200 with the adapter 100 can quickly be attached in electrical connection with the external connector 400 by a user. The external connector 400 may comprise a belt wearable by the person. The electrical device 200 with the adapter 100 may thus be portable and easily removable from and easily attachable back to the external connector 400 because of the electrical connector elements 104 simply press against their counterparts without sliding. The external connector 400 may alternatively or additionally be in a car or inside a building.

The electrical male connector 102 and the connector elements 104 are in electrical connection with each other on or within the adapter 100. A suitable connection is enabled through electrical conductors (dashed lines in FIG. 1C). The adapter 100 enables electrical adaptation between the external connector 400 and the female connector 202 of the electronic data processing device 200.

Figure 1C:
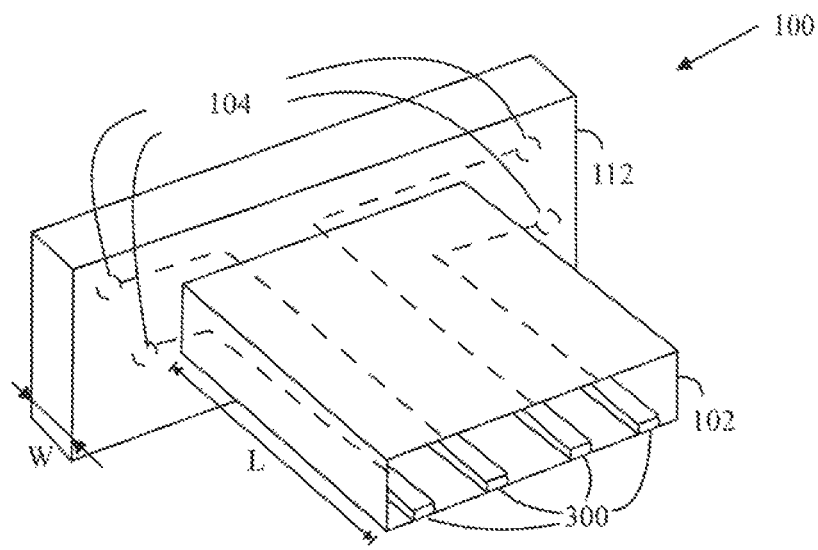
FIG. 1C illustrates an example where pins of a universal serial bus connector or the like and the electrical connector elements are in electrical connection with each other in a deterministic manner.

In an embodiment, the male connector 102 may comprise a universal serial bus (USB) connector. The USB connector may be a USB 1, USB 2, USB 3 or USB C connector, for example. As FIG. 1C illustrate, pins 300 of the universal serial bus connector or the like and the electrical connector elements 104 being in electrical connection with each other in a deterministic manner. In an embodiment, the male connector 102 may comprise an ethernet connector. In an embodiment, the male connector 102 may comprise a high definition multimedia interface (HDMI) connector. These connectors may be used in data transfer.

In an embodiment, at least one of the electrical connector elements 104 is a counterpart of a spring loaded pin 402 of the external connector 400. The external connector 400 with spring loaded pins 402, which protrude outwards without load, is illustrated in FIG. 4. The electrical connector elements 104 may, not only in this case but also generally, comprise pads which may be at least approximately flat pieces of stiff and electrically conductive material. A spring loaded pin 402 structure comprises a spring 404 which uses a spring force to push a pad 406 forward. When the pad 406 is in contact with its counterpart which pushes the pad 406 in a direction opposite to and stronger than the spring force, the pad 406 of the spring loaded pin 402 will move backwards. The movement of the pad 406 may be limited. The pad 406 may be flat, concave or convex such that, on average, its surface is at least approximately parallel to the surface in its environment. The surface of the pad 406 may be symmetrically inward or outward rounded such that its average normal is parallel to a normal of a flat pad 406. In an embodiment, the shape of a pad 406 (may be, flat, convex or concave) corresponds to the shape of a counterpart which may be pad or pin. The shape of the pad 406 may guide the counterpart such that their electrical connection becomes more reliable. The coupling is electrically conductive even if the coupling is poor, there is dirt between the pad and its counterpart or the pad and/or its counterpart are worn.

In an embodiment, the shape of an electrical connector element 104 (may be, flat, convex or concave) corresponds to the shape of a counterpart pin. The shape of the electrical connector element 104 may guide the counterpart pin such that their electrical connection becomes more reliable. The coupling is electrically conductive even if the coupling partially fails, there is dirt between the pin and pad or the pin and/or pad are worn.

In an embodiment, electrical connector elements 104 of the adapter 100 may comprise at least one spring loaded pin similar to or corresponding with that explained in association with and illustrated in FIG. 4. The advantages and properties of the pads 406 explained above in conjunction with FIG. 4 apply also to the electrical connector elements 104 well in this embodiment.

In an embodiment, the adapter 100 may transfer electrical energy from the external connector 400 to the electronic data processing device 200 through the electrical connector elements 104 and the electrical male connector 102. The electric energy transfer may be performed in a charging purpose of the electronic data processing device 200. That is, a battery of the electronic data processing device 200 may be charged with the electric energy received from the external connector 400. In FIG. 1A, pads for charging are illustrated with +- and --signs.

In an embodiment, the adapter 100 may transfer digital data between the external connector 400 and the electric apparatus 200 through the electrical connector elements 104 and the electrical male connector 102. The digital data may refer to still or video images, graphical information, audio signals or alphanumeric information, for example.

In an embodiment, the adapter 100 may transfer analog signals between the external connector 400 and the electric apparatus 200 through the electrical connector elements 104 and the electrical male connector 102. The analog signal may be an audio signal, for example.

Figure 5:
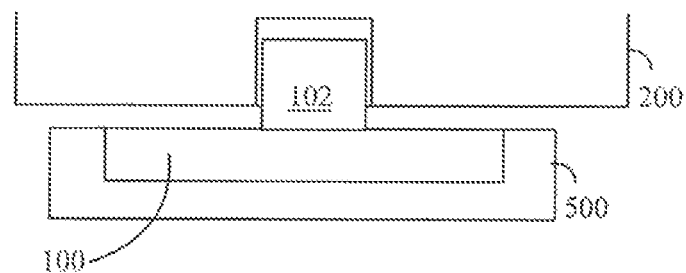
FIG. 5 illustrates an example of magnetic support of the adapter.

In an embodiment, the adapter 100 may comprise a fastening mechanism 110, 500 which attaches the adapter 100 and the electronic data processing device 200 to each other (see FIGS. 1A and 5).

In an embodiment, the fastening mechanism 110 may comprise a screw or rivet (see FIG. 1A). In an embodiment, the fastening mechanism 110 may comprise a magnet 500 (see FIG. 5). In an embodiment, the fastening mechanism 110 may comprise a shape matched tightly with the electronic data processing device 200. In an embodiment, the fastening mechanism 110 may comprise uneven surface pressable against the electronic data processing device 200. In an embodiment, the fastening mechanism 110 of the adapter 100 may have an uneven surface the height variation and/or spatial frequency of which is/are matched with that of a counterpart surface of the electronic data processing device 200.

In an embodiment an example of which is illustrated in FIG. 1C, a cross section of the adapter 100 resembles a shape of the letter T, a vertical section of which is formed of the electrical male connector 102. A part of the adapter 100 may form a horizontal section 112 which comprises the electrical connector elements 104 on a side different from that of the electrical male connector 102.

In an embodiment, a thickness W of the horizontal section 112 is thinner than a length L of the electrical male connector 102. The thickness W and the length L may be measured in the same direction.

In an embodiment, the adapter 100 may comprises a base section 120 which has the electrical male connector 102 protruding outwards (see FIG. 1A). At both ends of the base section 120 there may be projections 122 that extend in the same direction as the electrical male connector 102. A purpose of the projections 122 is to have the electronic data processing device 200 attached therebetween in an immobile manner. A shape of a surface of the projections 122 facing the electronic data processing device 200 may be made to fit to and be in contact with a surface of the electronic data processing device 200. Then the adapter 100 may be like a pocket for the electronic data processing device 200. In this example, the fastening mechanism 110 in the projections 122 may have the uneven surface the height variation and/or spatial frequency of which is/are matched with that of a counterpart surface of the electronic data processing device 200.

In an embodiment, the projections 122 may compress against sides of the electrical device 100 with a desired and/or determined non-zero force.

Figure 3:
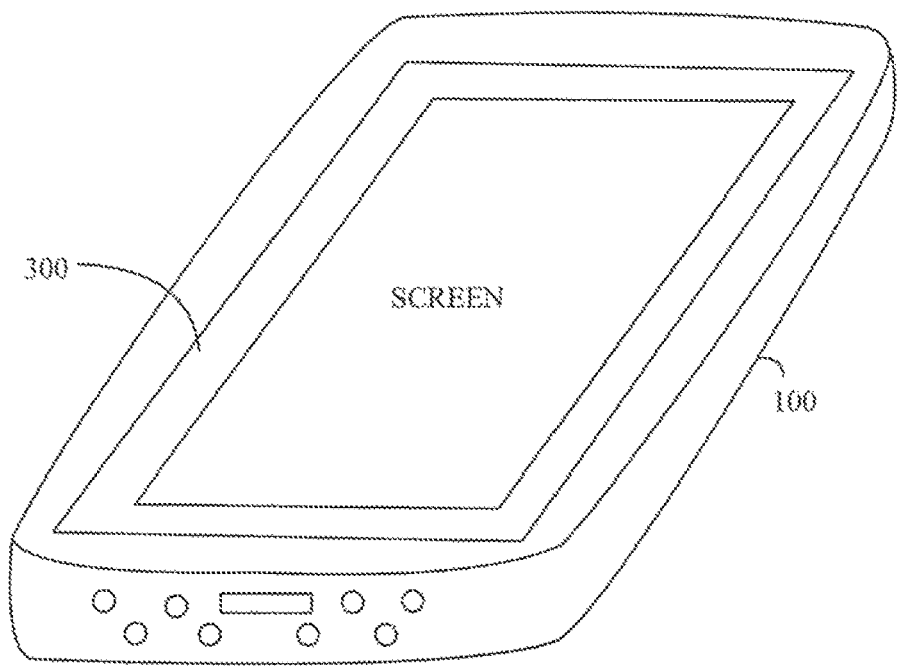
FIG. 3 illustrates an example where the adapter forms a cover into which the electronic data processing device can be inserted.

In an embodiment illustrated in FIG. 3, the adapter 100 may form a cover into which the electronic data processing device 200 can be inserted and from which the electronic data processing device 200 can be removed with a non-zero force. The cover may have an opening 300 at at least one interface of the electronic data processing device 100 (see FIG. 3).

In an embodiment, the adapter 100 may have a female connector in addition to the electrical elements 104 (rectangle in the middle).

Figure 6:
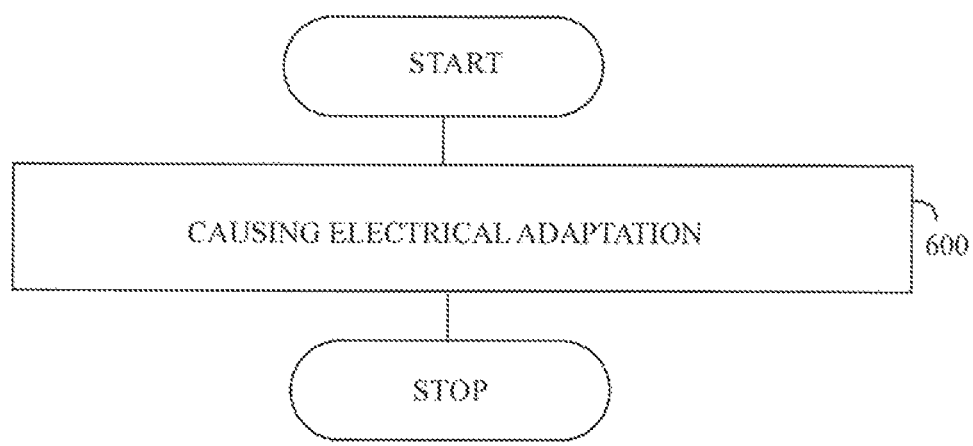
FIG. 6 illustrates of an example of a flow chart of the adaptation method.

FIG. 6 is a flow chart of the measurement method. In step 600, electrical adaptation is caused between an external connector 400 and a female connector 202 of the electronic data processing device 200 through an electrical male connector 102 of an adapter 100 and connector elements 104 which are in electrical connection with each other on or within an adapter 100, when the electrical male connector 102 of the adapter 100 is inserted into the female connector 202, the electrical male connector 102 and the female connector 202 being fittable to each other, and when the electrical connector elements 104, on a surface of the adapter 100, are coupled with elements 402 of the external connector 400, the surface of the electrical connector elements 104 being at least approximately averagely parallel to the surface of the adapter 100 adjacent to them.

It will be obvious to a person skilled in the art that, as technology advances, the inventive concept can be implemented in various ways. The invention and its embodiments are not limited to the example embodiments described above but may vary within the scope of the claims.

What is claimed is:

1. An adapter for a hand-held electronic data processing device, wherein the adapter comprises:
   an electrical male connector insertable and configured to fit into a female connector of the electronic data processing device, wherein electrical connector elements, on a surface of the adapter, are coupleable with elements of an external connector, and the surface of the electrical connector elements are at least approximately averagely parallel to the surface of the adapter adjacent to them, and
   the electrical male connector and the connector elements are in electrical connection with each other on or within the adapter for electrical adaptation between the external connector and the female connector of the electronic data processing device, wherein the adapter comprises a base section which has the electrical male connector protruding outwards, and, at both ends of the base section, projections extending in the same direction as the electrical male connector for having the electronic data processing device therebetween, a shape of a surface of the projections facing the electronic data processing device being made to fit to and be in contact with the electronic data processing device.

2. The apparatus of claim 1, wherein the male connector comprises a universal serial bus connector, pins of the universal serial bus connector and the electrical connector elements being in electrical connection with each other in a deterministic manner.

3. The apparatus of claim 1, wherein at least one of the electrical connector elements is a counterpart of a spring loaded pin of the external connector.

4. The apparatus of claim 1, wherein electrical connector elements comprise at least one spring loaded pin.

5. The apparatus of claim 1, wherein the adapter is configured to transfer electrical energy from the external connector to the electric apparatus for a charging purpose through the electrical connector elements and the electrical male connector.

6. The apparatus of claim 1, wherein the adapter is configured to transfer digital data between the external connector and the electric apparatus through the electrical connector elements and the electrical male connector.

7. The apparatus of claim 1, wherein the adapter is configured to transfer analog signals between the external connector and the electric apparatus through the electrical connector elements and the electrical male connector.

8. The apparatus of claim 1, wherein the adapter comprises a fastening mechanism which is configured to attach the adapter and the electronic data processing device to each other.

9. The apparatus of claim 1, wherein the fastening mechanism comprises at least one of the following: a screw, a magnet, a shape matched tightly with the electronic data processing device.

10. The apparatus of claim 1, wherein a cross section of the adapter has a shape of the letter T a vertical section of which is formed of the electrical male connector, and a part of the adapter forming a horizontal section of the shape of the letter T comprises the electrical connector elements on a side different from that of the electrical male connector.

11. The apparatus of claim 10, wherein a thickness of the horizontal section is thinner than a length of the electrical male connector.

12. The apparatus of claim 1, wherein the projections are configured to compress against sides of the electronic data processing device.

13. An adapter for a hand-held electronic data processing device, wherein the adapter comprises:
   an electrical male connector insertable and configured to fit into a female connector of the electronic data processing device, wherein electrical connector elements, on a surface of the adapter, are coupleable with elements of an external connector, and the surface of the electrical connector elements are at least approximately averagely parallel to the surface of the adapter adjacent to them, and
   the electrical male connector and the connector elements are in electrical connection with each other on or within the adapter for electrical adaptation between the external connector and the female connector of the electronic data processing device, wherein the adapter is configured to form a cover into which the electronic data processing device is insertable and from which the electronic data processing device is removable with a non-zero force, the cover having an opening at at least one interface of the electronic data processing device.

14. An adaptation method of a hand-held electronic data processing device, the method comprising:

causing electrical adaptation between an external connector and a female connector of the electronic data processing device through an electrical male connector of an adapter and connector elements which are in electrical connection with each other on or within an adapter, when the electrical male connector of the adapter is inserted into the female connector, the electrical male connector and the female connector being fittable to each other, and when the electrical connector elements, on a surface of the adapter, are coupled with elements of the external connector, the surface of the electrical connector elements being at least approximately averagely parallel to the surface of the adapter adjacent to them, wherein the adapter comprises a base section which has the electrical male connector protruding outwards, and, at both ends of the base section, projections extending in the same direction as the electrical male connector for having the electronic data processing device therebetween, a shape of a surface of the projections facing the electronic data processing device being made to fit to and be in contact with the electronic data processing device.

* * * * *